United States Patent [19]

Higaki

[11] Patent Number: 4,842,048
[45] Date of Patent: Jun. 27, 1989

[54] SYSTEM FOR DRAWING THE OPEN AIR INDOORS

[75] Inventor: Yasuo Higaki, Eniwa, Japan

[73] Assignee: Sapporo Alna Co., Ltd., Hokkaido, Japan

[21] Appl. No.: 68,680

[22] Filed: Jun. 30, 1987

[30] Foreign Application Priority Data

Apr. 28, 1987 [JP] Japan .................. 62-105747

[51] Int. Cl.⁴ .............................. F24F 3/00
[52] U.S. Cl. .................... 165/45; 165/48.1; 165/909
[58] Field of Search ............ 165/45, 909, 48.1; 126/400

[56] References Cited

U.S. PATENT DOCUMENTS

| | | | |
|---|---|---|---|
| 1,974,244 | 9/1934 | Lapp | 165/45 X |
| 2,355,495 | 8/1944 | Zier, Jr. | 98/46 |
| 2,793,509 | 5/1957 | Keen | 165/45 X |
| 4,071,080 | 1/1978 | Bridgers | 165/909 X |
| 4,128,204 | 12/1978 | Wade | 126/400 X |
| 4,448,238 | 5/1984 | Singleton, Jr. et al. | 165/45 |
| 4,452,229 | 6/1984 | Powers | 165/45 X |

FOREIGN PATENT DOCUMENTS

| | | | |
|---|---|---|---|
| 60128 | 4/1982 | Japan | 165/45 |
| 248161 | 4/1947 | Switzerland | 165/45 |

Primary Examiner—Harold Joyce
Attorney, Agent, or Firm—Schweitzer & Cornman

[57] ABSTRACT

A system for drawing the open air indoors comprises an an open-air flow pipe and an open-air distribution pipe of which the respective one ends are made to communicate with each other. The open-air flow pipe is laid underground while its other end is made to communicate with an intake port provided above the ground. The other end of the open-air distribution pipe is made to communicate with the room of a building. The open air with which heat is exchanged under the ground during passing the open-air flow pipe and the open-air distribution pipe is drawn indoors, thereby allowing the room to be air-conditioned.

3 Claims, 14 Drawing Sheets

SYSTEM FOR DRAWING THE OPEN AIR INDOORS

BACKGROUND OF THE INVENTION

The present invention relates to a system for drawing the open air indoors, which is used for cooling and warming the rooms of a building respectively in winter and summer, and still more used for ventilating the rooms through every season.

To warm the room of a building in a cold district and the like in winter, a fuel burning type of heating apparatus such as a stove, etc., provided indoors has previously been used in such a condition as to close the rooms. For this reason, the rooms are subject to air pollution. In addition, when the open air is drawn directly indoors as it is necessary to ventilate the room frequently, a temperature in the room falls suddenly owing to the cold open air.

To overcome such disadvantages, it is desirable to employ a special apparatus for heating directly only the open air to be drawn indoors. However, such a case brings about a problem of the remarkably increased cost of heating.

Besides, there has previously been proposed an indoor heating system of a type utilizing solar heat, for example, a system structured so as to suck and transfer heat indoors by means of films of heat absorbing material mounted on the external surface of the walls of a building. However, there are few occasions of receiving solar heat in a cold district and the like in winter, so that the type system conduces no desirable effectiveness owing to the low efficiency of heat absorption.

On the other hand, in summer is widely used a compact room air cooling apparatus, but it has disadvantages of a difficulty to cool a room especially in the mid-summer, and a sudden rise in the room temperature on ventilating. Additionally on increasing the operating rate and hour of the apparatus, a problem of the remarkably increased cost of heating is brought about.

OBJECTS AND SUMMARY OF THE INVENTION

Accordingly, an object of the present invention is to provide a system for drawing the opening air indoors which, permits, in winter, of both ventilating and warming indoor rooms, in addition of reducing the cost of heating rooms by such a structure as to warm the open air relatively by the subterranean heat, and then draw it indoors.

Another object of the present invention is to provide a system for drawing the opening air indoors which permits, in summer, of both ventilating and cooling indoor rooms, in addition of reducing the cost of cooling rooms by such a structure as to cool the open air underground relatively, and then draw it indoors.

A further object of the present invention is to provide a system for drawing the opening air indoors which permits of reducing the space occupied by a heating and cooling system in the building by such a structure as to lay pipes or the likes in the underground area of the building.

Other objects and advantages of the present invention will become apparent from the following detailed description taken in connection with the accompanying drawings.

BRIEF DESCRIPTION OF THE DRAWINGS

With reference to the accompanying drawings.

DETAILED DESCRIPTION OF THE INVENTION

Figure 1:
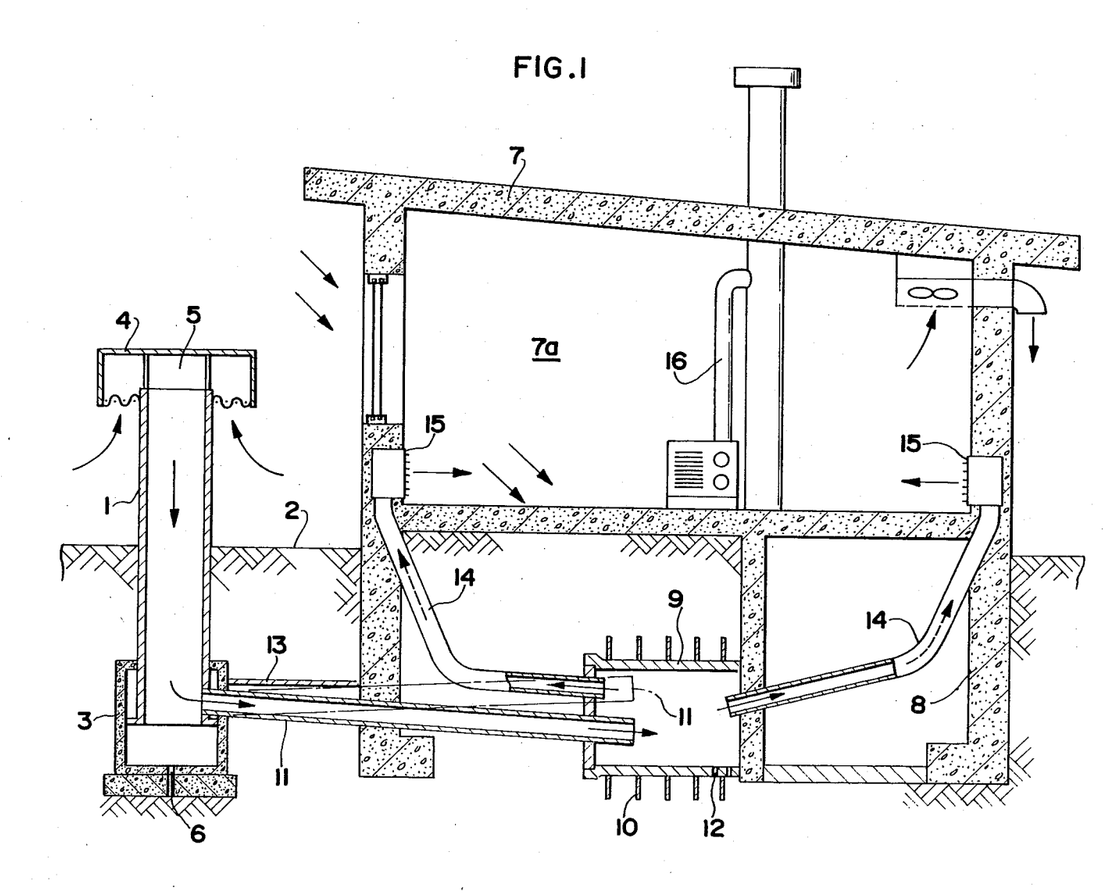
FIG. 1 is a vertical sectional view of a building where is provided the first type embodiment of the present invention.

Referring now to FIGS. 1 to 4 inclusive illustrating the first type embodiment of the present invention, an open-air intake duct 1 is provided, as apparant from FIG. 1, uprightly and outside a building 7 in such a manner that its upper part stands up to about one meter above the ground 2 while its lower part is buried about a half to one meter under the ground 2 with its lower end put into a hollow underlying member 3 which is beforehand buried underground.

The upper end of the air intake duct 1 is provided with an open-air intake port 5 covered with a protecting means 4 for rain and insects. The above-mentioned underlying member 3 has a drain hole 6 formed in the bottom thereof. The building 7 has concrete foundation walls 8 buried and formed integrally therewith in its lower parts, by which the building 7 is supported about a half to one meter under the ground. Inside the enclosure of the foundation walls 8, there is placed and buried a transferring tank 9 made up of metal or synthetic resin, preferably of fiber reinforced plastics. Although the above-mentioned tank 9 has its one side wall formed by a concrete foundation wall 8, it may be configured in a box independent of the concrete foundation wall 8. The transferring tank 9 is fixed on the outside with a great number of fins 10 projecting outwards, whereby the tank is adapted, e.g, in winter, to effectively suck a subterranean heat having a relative high temperature. The tank 9 also has a drain hole 12 formed in the bottom.

The open-air intake duct 1 and the transferring tank 9 communicates mutually by means of an open-air flow pipe 11 made of metal or synthetic resin such as rigid polyvinyl chloride, which is placed and buried underground. The open-air flow pipe in the embodiment is arranged at a down grade, or substantially horizontally, as shown by solid line in FIG. 1, towards the transferring tank 9, but preferrably it may be arranged at a somewhat up grade as shown by chain line in the same Figure. This ensures that water is prevented from flowing through the open-air flow pipe 11 into the tank 9. Just over the flow pipe 11, there is provided a guard plate 13, thereby protecting the pipe 11 from soil pressure.

The transferring tank 9 communicates with several indoor ventilating openings 15 by means of open-air distribution pipes 14 made of metal or rigid polyvinyl chloride. In the indoor room 7a of the building, there is placed a room air heating apparatus such a stove.

With respect to the soil by which the open-air flow pipe 11, the open-air distribution pipes 14 and the transferring tank 9 are buried, it is possible to use sediment, cobble stone or gravel present at the place of the building, but it is preferable to use volcanic ashes from a point of view of the effect of sucking and reserving underground heat.

Figure 2:
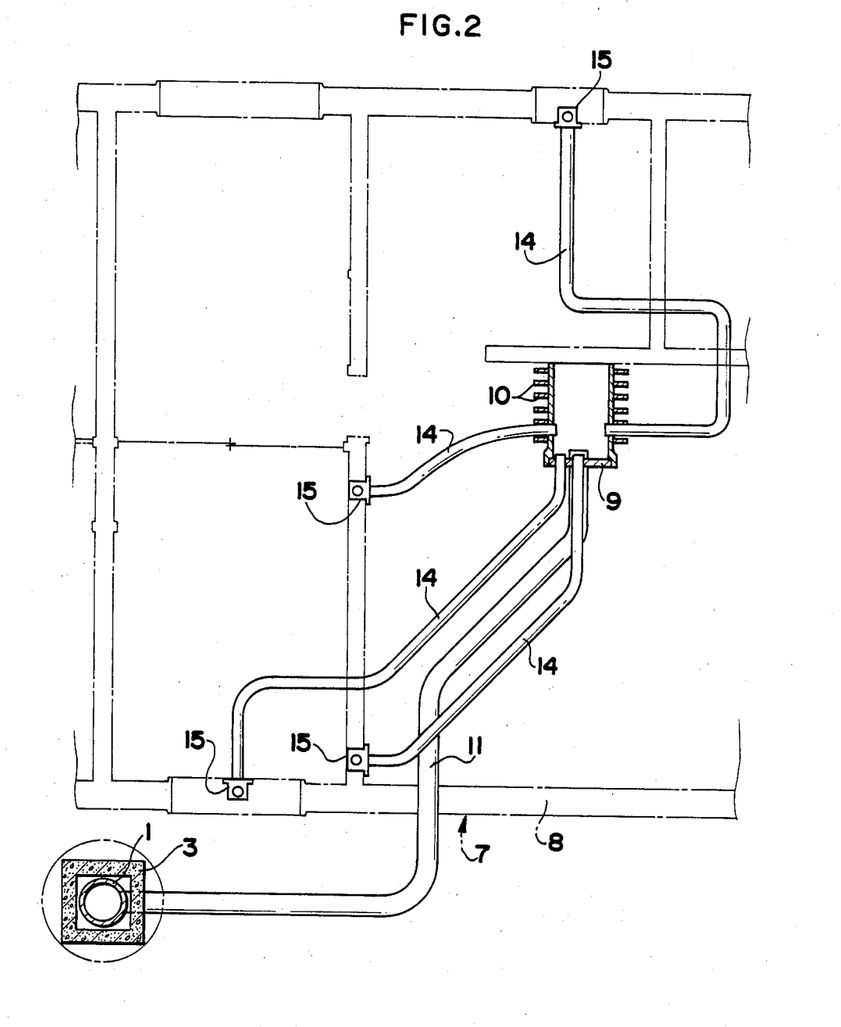
FIG. 2 is a horizontal view illustrative of the arrangement of the pipes etc.,of the first type embodiment.

In FIG. 2, there is shown an arrangement of the open-air flow pipe 11 and the open-air distribution pipes 14, from which it is appreciated that each of their pipes 11, 14 has an extra length and gets laid on a meandering course, whereby heat-exchange may be performed effectively between the open air flowing in their pipes 11, 14 and the soil.

In the embodiment described above, the open air which is drawn through the open-air intake duct 1 into the open-air flow pipe 11 is warmed by the subterranean heat in soil, and then flows into a transferring tank 9. In addition, the open air drawn in the transferring tank 9 is still more warmed while flowing through the transferring tank 9 and the open-air distribution pipe 14, and then the air that grew remarkably warmer is drawn from the ventilation opening 15 into the room 7a, where the remarkably warmer air makes an ascending air current, thereby being drawn into the room one after another continuously.

According to the above-mentioned embodiment, the heating of room air in winter is performed by sucking effectively the heat reserved constantly throughout the year, under the ground which receives the heat of the sun in the daytime.

Additionally in summer, the hot open air is cooled by the soil having a relatively low temperature while flowing through the underground passages 1, 11, 9 and 14, whereby the room may be cooled.

Furthermore, through every season the fresh open-air may be drawn indoors, thereby may lead to a life environment good for the health.

Figure 3:
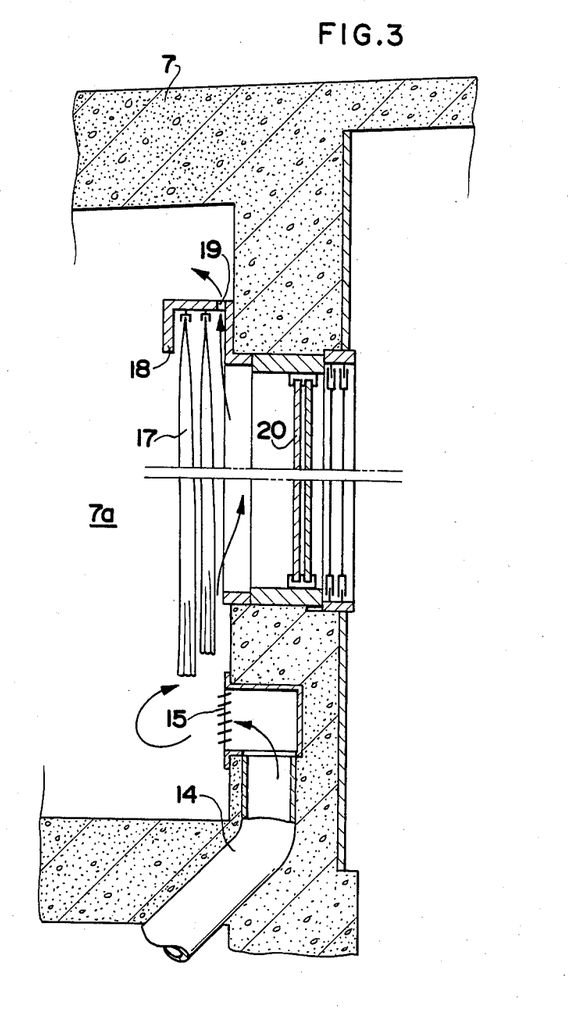
FIG. 3 is an enlarged vertical sectional view of the window and its surrounding area of the building shown in FIG. 1.

Referring to FIG. 3 illustrating a window and its surrounding area of the building 7 shown in FIG. 1, the open air which is drawn indoors from the ventilation opening 15 circulates owing to the ascending current of the warmer air. In the curtain box 18 supporting a window curtain 17, there is formed a draught hole 19; consequently the above-mentioned circulating air passes between the curtain 17 and a window glass 20, and through the draught hole 19 as shown by arrows in the drawing. For this reason, the surface temperature in the window 20 rises so that it is possible to prevent a dew condensation.

Figure 4:
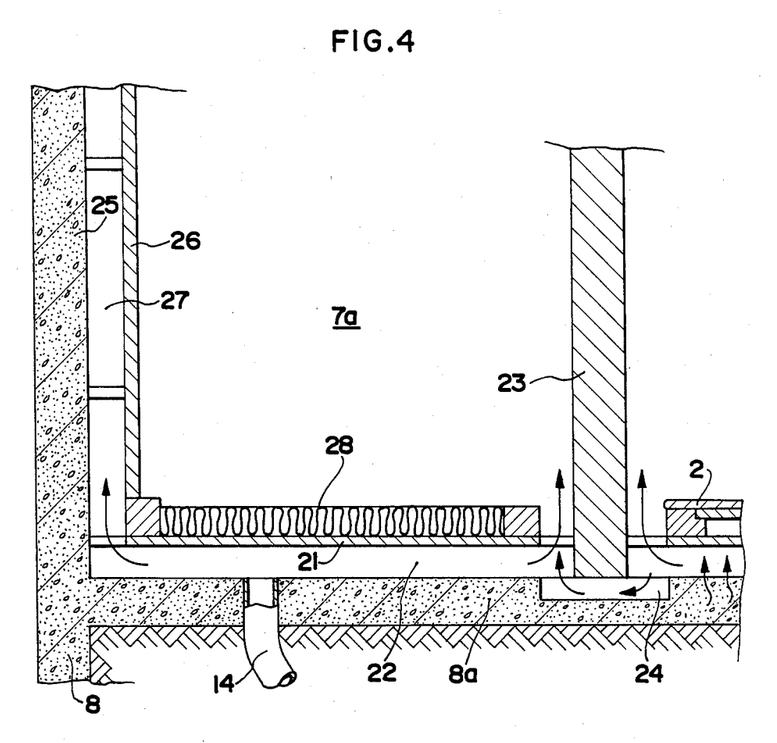
FIG. 4 is an enlarged vertical sectional view illustrative in details of the floor and walls of the building shown in FIG. 1.

Referring to FIG. 4 illustrating in details the floor and wall and their surrounding area of the building 7 in FIG. 1, there is formed a space between the concrete footing 8a on the ground and the floor plates 21 of every room 7a. Also below the lower end of the partition 23 between too rooms, there is formed a passage 24 communicating with the two rooms. Furthermore, between a concrete external wall 25 and an indoor internal wall 26, there is a space 27. In addition, the open-air distribution pipe 14 is adapted to communicate with these spaces 22, 27 and passage 24. According to the above-mentioned arrangement, the room 7a may be warmed and cooled indirectly respectively in winter and summer also through the floor plates 21 and a carpet 28 thereon and the internal wall 27.

Figure 5:
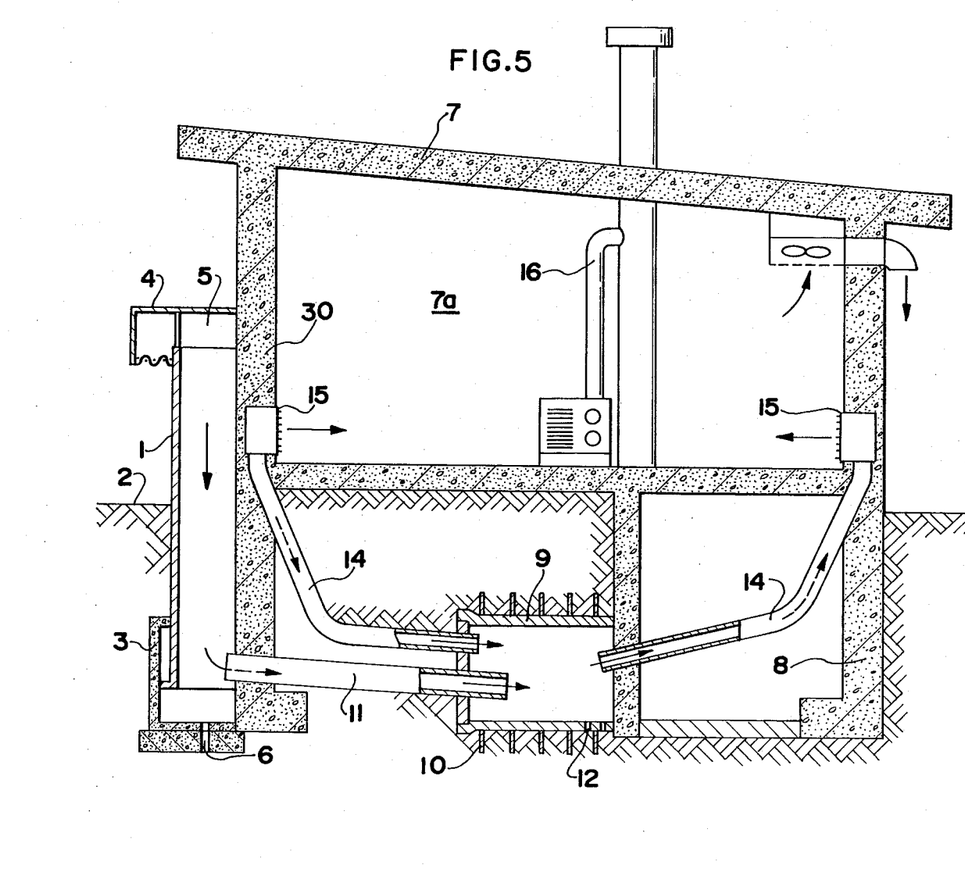
FIG. 5 is a vertical sectional view of a building where is provided a modification of the above-mentioned first type embodiment.

Referring to FIG. 5 illustrating a modification of the first type embodiment in FIG. 1, wherein like elements are given like reference signs, the modification is different in the following points from the first type embodiment: a channel member of a substantially C shape in cross section is employed as an open-air intake duct 1, and is mounted integrally on the external wall 30 of the building 7. In other words, this modification is the one that utilizes the external wall 30 as a part of an open-air intake duct. Consequently, it is possible to simplify the construction of an open-air intake duct 1, and to utilize heat energy to be sucked in the external wall of the building for the purpose of warming the room air.

Figure 6:
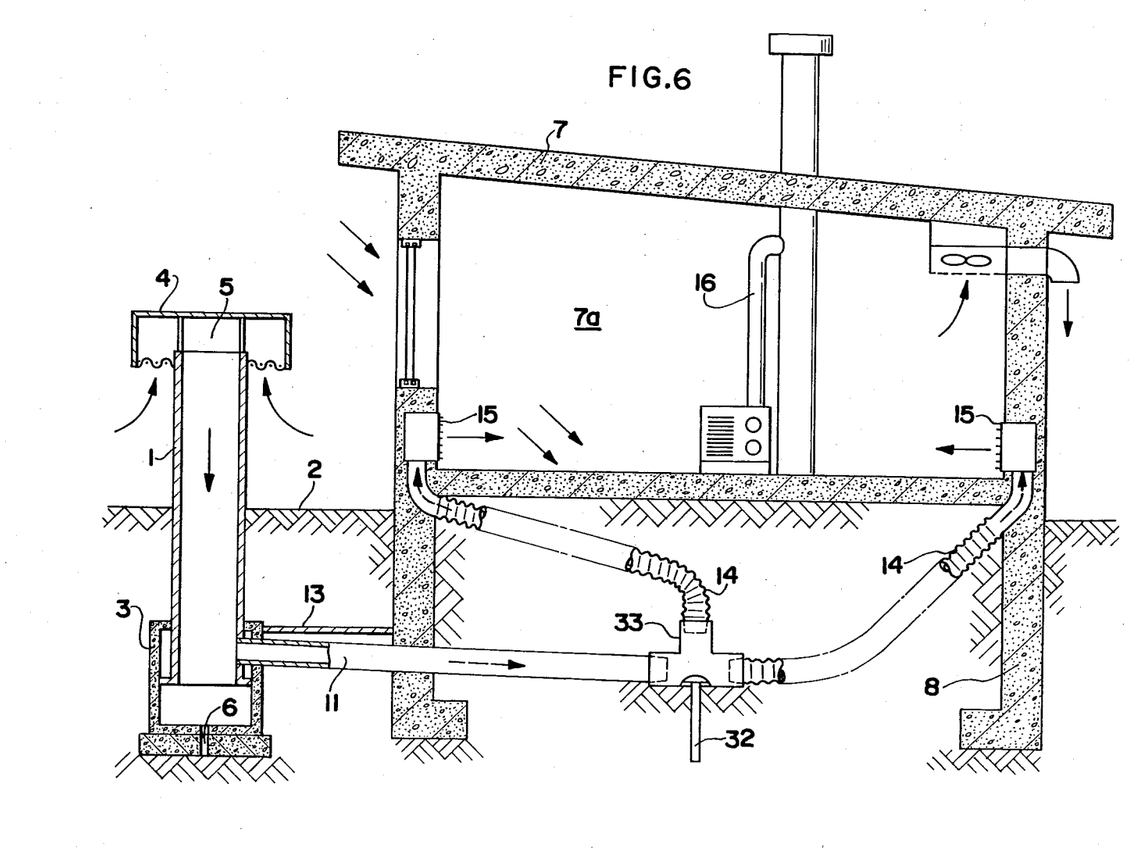
FIG. 6 is a vertical sectional view of a building where is provided another modification of the first type embodiment.

Referring to FIG. 6 illustrating another modification of the first type embodiment in FIG. 1, wherein like elements are given like reference signs, the another modification is different in the following points from the first embodiment: the transferring tank 9 employed in the first embodiment is replaced by a branch joint 33 with a drain pipe made of metal or synthetic resin, preferably of fiber reinforced plastics, which is disposed underground and connected with the open-air flow pipe 11 and the open-air distribution pipes 14. These open-air distribution pipes 14 employ a bellow type pipe having a great amount of contact area so that heat exchange may be performed still more effectively between the open air flowing in the pipes 14 and the soil. In addition, the open-air flow pipe 11 may employ a bellow type pipe in order to increase the heat exchange efficiency between the open air flowing therein and the soil.

Figure 7:
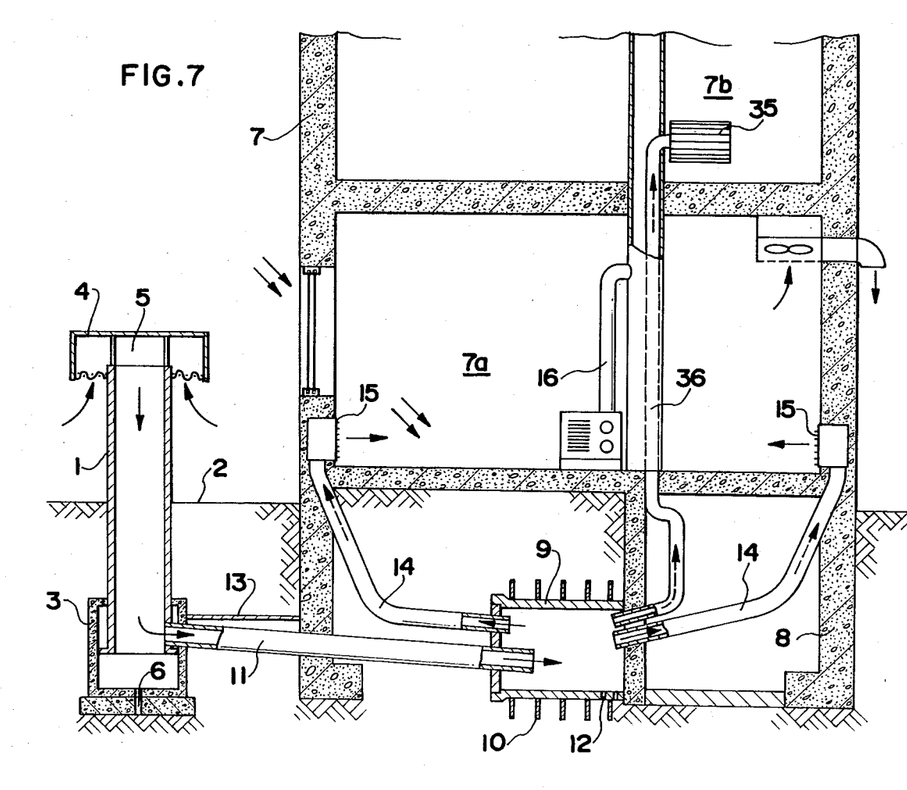
FIG. 7 is a vertical sectional view of building where is provided a further modification of the first type embodiment.

Referring to FIG. 7 of a further modification of the first type embodiment in FIG. 1, wherein like elements are given like reference signs, the further modification is different in the following points from the first embodiment: with respect to the one 14 of the open-air distribution pipes which communicates with the ventilation opening 35 provided in an upstairs room 7b, the greater part of the whole length of the pipe 14 is laid inside the exhaust gas flue 36 attached to a heating apparatus 16 such as stove. In the above-mentioned arrangement, the open air flowing in the distribution pipe 14 is warmed in the section of the flue 36 by heat-exchanging with the thermal energy present in the dispersed gas and smoke inside the flue 36.

Accordingly, in case the open-air distribution pipe 14 is laid on a long way it is possible to prevent the halfway loss of heat, and still further to draw the considerably warmed open air in the upstairs room 7b. In addition, it is possible to utilize the thermal energy discharged outdoors from the flue 36; consequently serve for saving energy.

Figure 8:
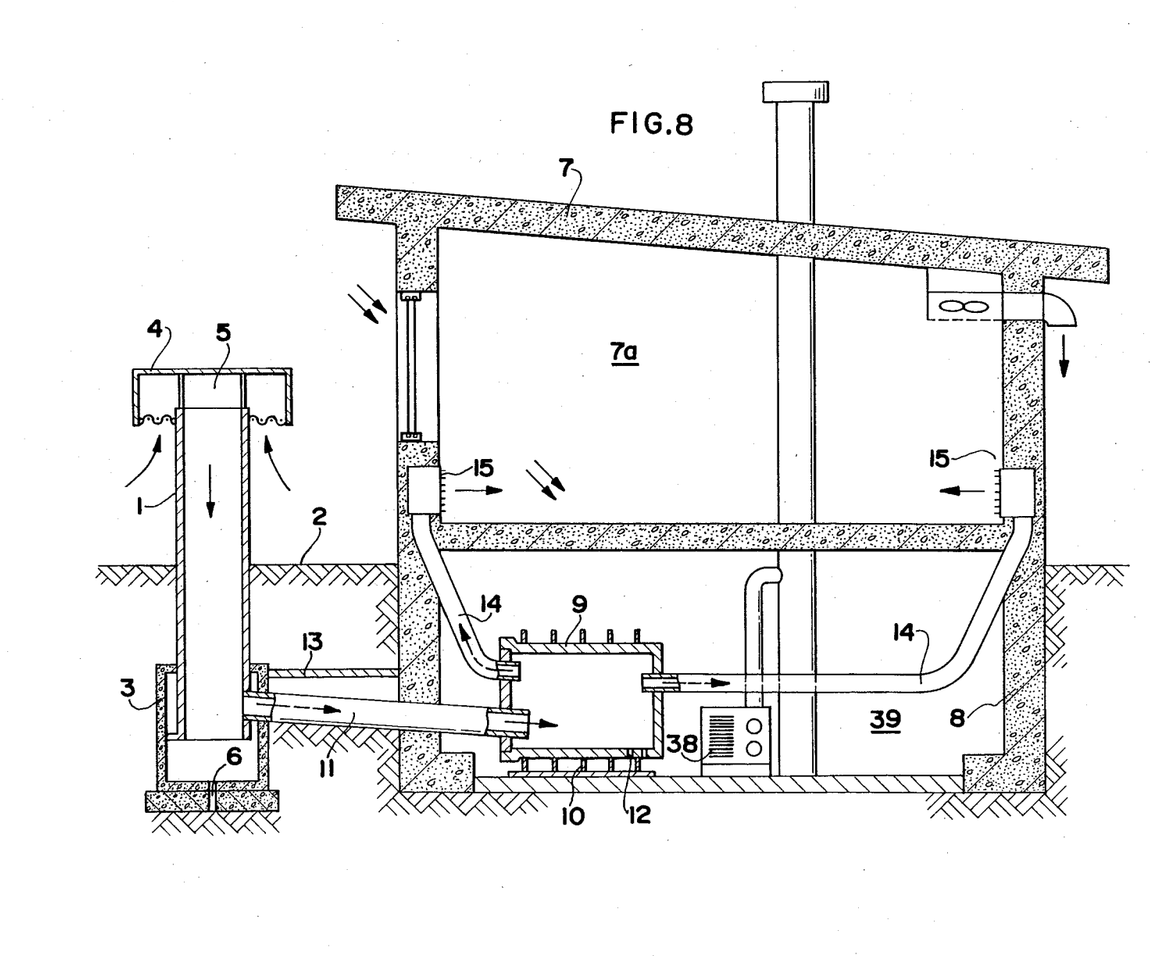
FIG. 8 is a vertical sectional view of a building where is provided the second type embodiment of the present invention.

Referring to FIG. 8 illustrating the second type embodiment of the present invention, wherein the same elements are given the same reference signs is the first type embodiment, the second type embodiment is different in the following points from the first type embodiment: the transferring tank 9 is disposed in the basement 39 of a building to be warmed by a heating apparatus such as a kerosene stove provided therein. In winter, the thermal energy emitting from the heating apparatus 38 makes the basement 39 warm, thereby warming again the open air in the transferring tank 9 which has already been warmed during passing the open air flow pipe 11. In addition, the twice warmed open-air is warmed once more while flowing the open-air distribution pipe 14, and then is drawn from the ventilation opening 15 into the indoor room 7a.

Referring to FIGS. 9 to 12 inclusive illustrating the third type embodiment of the present invention, wherein the same elements are given the same signs as the first type embodiment, the third type embodiment is different in the following points from the first type embodiment: the transferring tank 9, of which the sides and bottom are covered outside with insulators 42 made up, for example, mainly of polyuretane foam plastics, is provided in the underground space formed under the concrete footing of a building 7. The transferring tank 9 has a drain hole 43 formed in the bottom. In addition, inside the transferring tank 9, there is placed a heat exchange tank 44 of which the bottom has an air flow hole. Further the heat exchange tank 44 houses a first heat exchange apparatus 45 which consists of a cylinder of stainless steel and a great number of fins fixed therearound.

On the other hand, around an exhaust gas flue 48 attached to a heating apparatus 47 such as a kerosene stove provided in the downstair room 7c of a building 7, there is fitted a second heat exchange apparatus 49. The second heat exchange apparatus 49 shown in FIG. 10 through 12, in details, consists of a double cylinder 50, i.e. a set of inner and outer cylinders, 50a, 50b, produced by extrusion of aluminum or its alloy, and a pair of ring-like lids 51, 52 for covering the upper and lower openings of the double cylinder 50.

Figure 9:
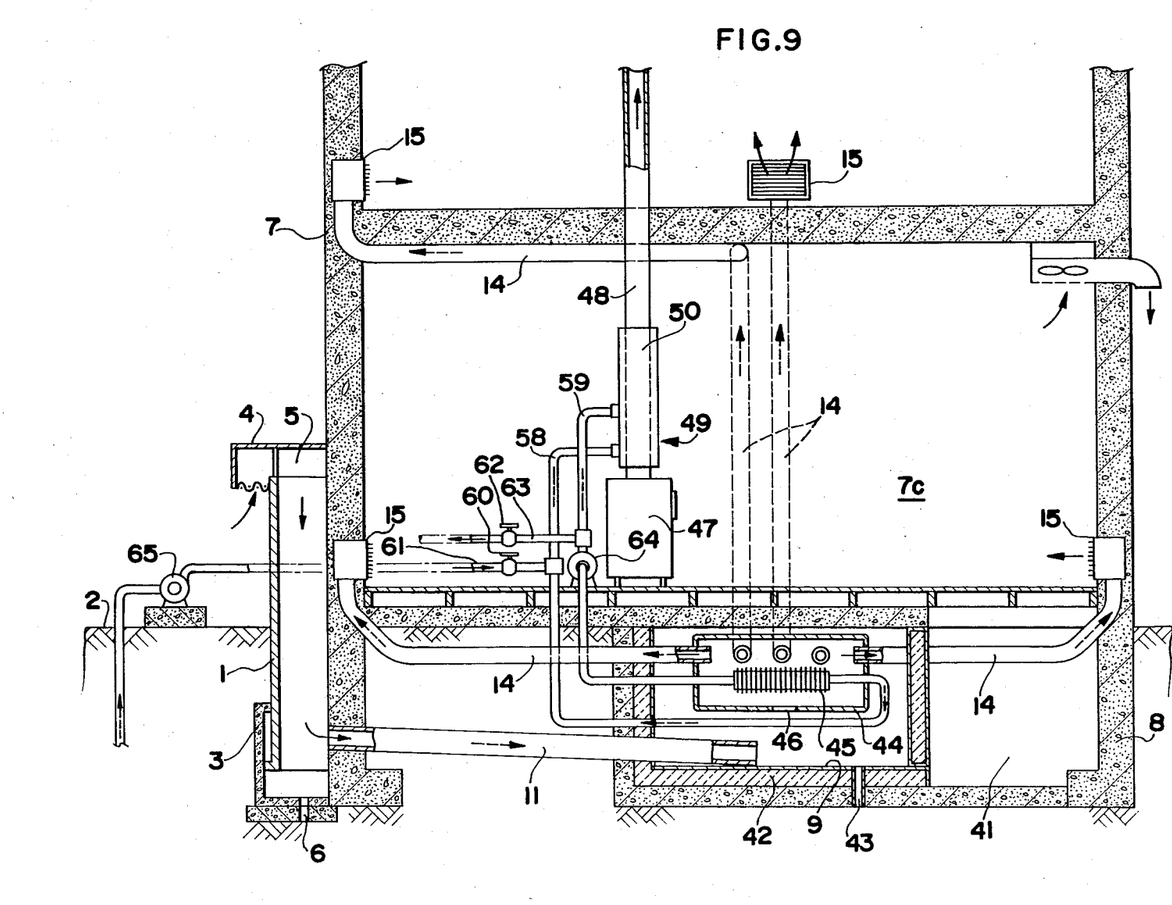
FIG. 9 is a vertical sectional view of a building where is provided the third type embodiment of the present invention.
Figures 10, 11, 12:
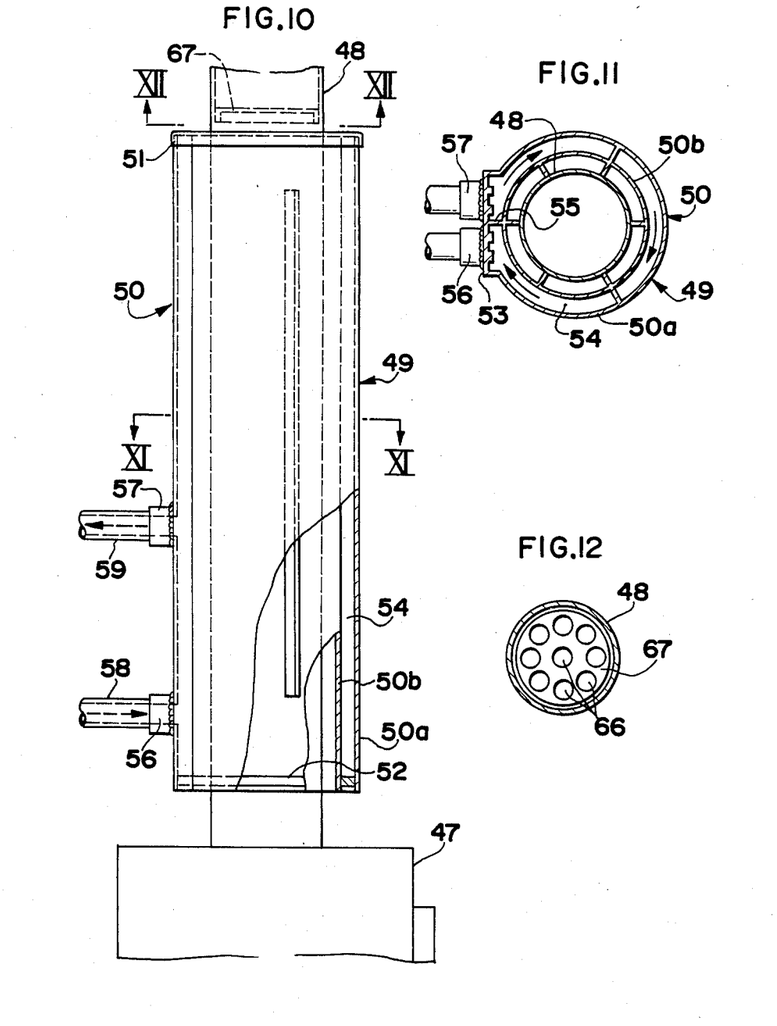
FIG. 10 is an enlarged front view cutaway partly of a second heat exchange apparatus in the third type embodiment shown in FIG. 9.
FIG. 11 is a cross sectional plan view taken on line XI—XI of FIG. 10.
FIG. 12 is a cross sectional plane view taken on line XII—XII of FIG. 10.

The double cylinder 50 has its surface, i.e, of the outer cylinder 50a, formed partly into a longitudinal flat appearance. From the middle of the flat part 53 to the inner cylinder 50b opposite thereto, there is provided a wall 55 which connects the two cylinder 50a, 50b and divides the space enclosed by the two cylinder 50a, 50b. Moreover, the above-mentioned flat part has an inlet 56 formed in a half side and an outlet 57 formed in another half side of right and left sides, to which are connected respectively the one ends of fluid circulation pipes 58, 59 of stainless steel while the other ends thereof also are connected respectively with the both ends of the above-mentioned first heat exchange apparatus 45 as shown in FIG. 9, so that the first heat exchange apparatus 45 and the second heat exchange apparatus 49 communicate mutually.

In addition, in the longitudinal midway passage of the fluid supply pipe 59 of the above-mentioned fluid circulation pipes, there is mounted a circulation pump 64, as well as is connected a water outflow pipe 63 with a valve 62, while in the longitudinal midway passage of the fluid return pipe 58, there is connected an underground water inflow pipe 61 with a valve 60, in which is mounted outdoors an underground water pump 65.

Besides, inside the exhaust gas flue 48, there is fitted a restriction disc 67 having a plurality of small holes 66 such as in FIG. 12, thereby restricting the flowing-out rate of exhaust gas so that the coefficient of heat exchange of the second heat exchange apparatus 49 can be increase.

In the operation of the third type embodiment described above, in respect to use in winter, the valves 60, 62 are shut, and then the circulation pump 64 is actuated. As a result, the water inside the double cylinder 50 of the second heat exchange apparatus 49 is heated by means of a high-temperature exhaust gas, and flow in the first heat exchange apparatus 45 through the fluid supply pipe 59, whereby the room of the transferring tank 9 is warmed owing to heat radiation. The water which have radiated heat in the first heat exchange apparatus 45 is returned into the second heat exchange apparatus 49 through the fluid return pipe 58 in order to circulate water.

On the other hand, the open air drawn in the open-air intake duct is warmed relatively during passing the open-air flow pipe 11, and then enters the transferring tank 9, where the open air is heated further by means of the first heat exchange apparatus 45. The considerably warmed air is drawn in the room 7c of the building through the open-air distribution pipes 14 from the ventilation openings 15.

In respect to use in summer, the valves 60, 62 are opened, and then the underground water pump 65 is actuated. The relatively cool underground water is drawn up and flown in the first heat exchange apparatus 45, where the room of the transferring tank 44 gets cooled. The water receiving the heat in the first heat exchange apparatus 45 is discharged outdoors through a water outflow pipe 63.

On the other hand, the open air drawn in the open-air intake duct is cooled relatively during passing the open-air flow pipe 11, and then enters the transferring tank 9, where the open-air is cooled further by means of the first heat exchanger 45. The considerably cooled air is drawn in the room 7c of the building through the open-air distribution pipes 14 from the ventilation openings 15.

Figure 13:
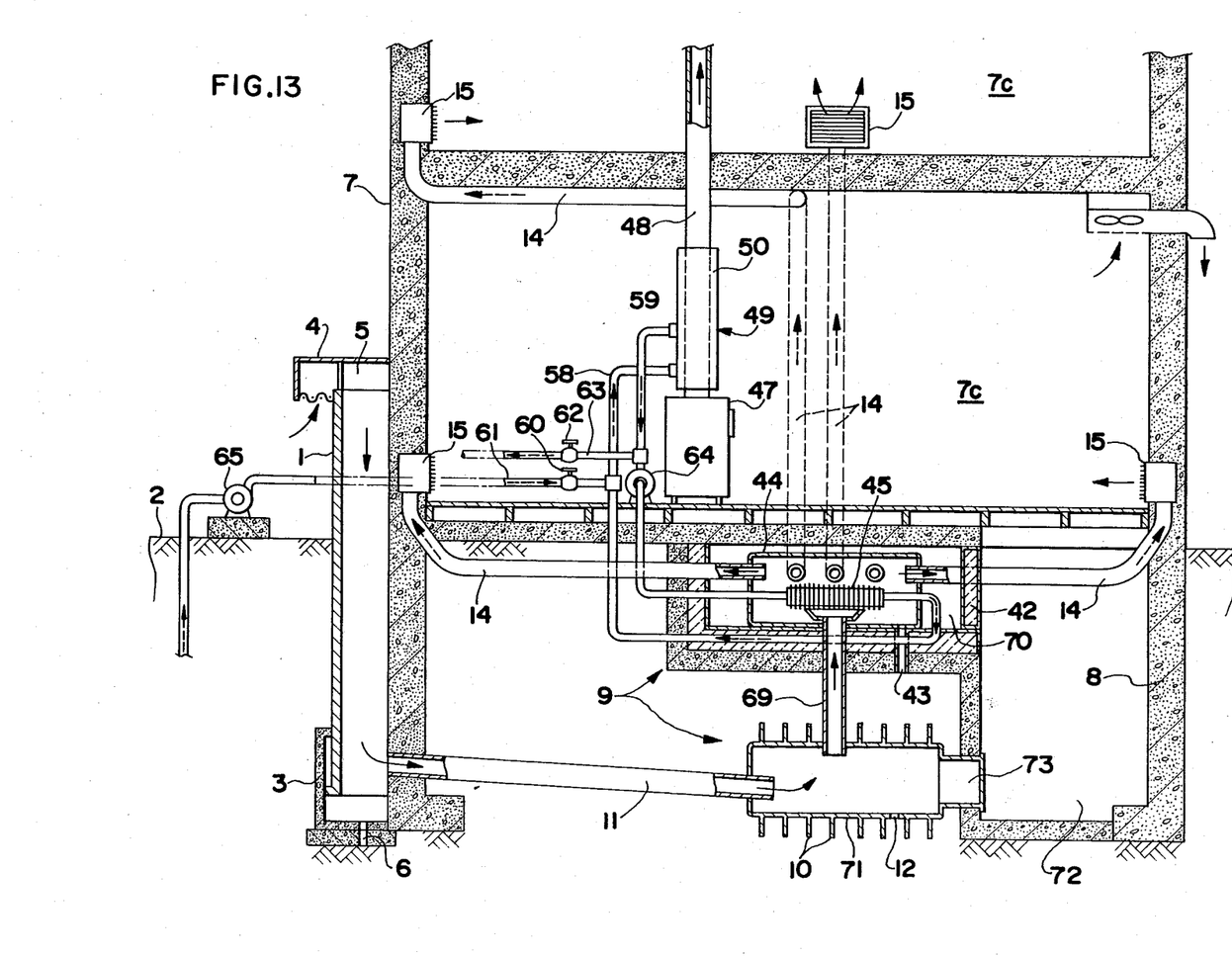
FIG. 13 is a vertical sectional view of a building where is provided the fourth type embodiment of the present invention.

Referring to FIG. 13 illustrating the fourth embodiment of the present invention, wherein the same elements are given the same reference characters as the first and third type embodiments, this fourth embodiment is different in following points from the above-mentioned embodiment: a transferring tank includes a pair of upper transferring tank 70 and lower transferring tank 71 which communicate with one another by a communication pipe 69. The upper transferring tank 70 has the substantially same construction as that shown by the numeral 9 in FIG. 9, while the lower transferring tank 71 has the substantially same construction as that shown by the numeral 9 in FIG. 1. The open-air flow pipe 11 is connected with the lower transferring tank 71, and the open-air distribution pipes 14 are connected with the upper transferring tank 70. The lower transferring tank 71 has its one side with a inspection prolongation 73 adjacent to a inspection room 72.

In the operation of the fourth embodiment described above, in respect to use in winter, first the open air drawn in the open-air intake duct 1 is warmed relatively by the subterranean heat during passing the open-air flow pipe 11, and then is carried and more warmed in the lower transferring tank 71. In the next stage, the open air enters through the communication pipe 69 the upper transferring tank 70, where the open air gets still more warmed by means of the first heat exchange apparatus 45 in the same manner as the third embodiment. Finally, the considerably warmed open air is drawn from the ventilation openings 15 in the indoor rooms 7c of the building through the open-air distribution pipes 14.

To the contrary, in respect to use in summer, the open air drawn in the open-air intake duct is cooled during passing the open-air flow pipe 11 by the relatively low temperatured soil, and then enters the lower transferring tank 71, where the open air gets more cooled also by the soil. Furthermore the open air enters through the communication pipe 69 the upper transferring tank 70, where gets still more cooled by means of the first heat exchange apparatus 45, and then is drawn, in a considerably cool condition, from the ventilation openings 15 into the indoor rooms 7c of the building through the open-air distribution pipes 14 in the same manner as the third embodiment.

Figure 14:
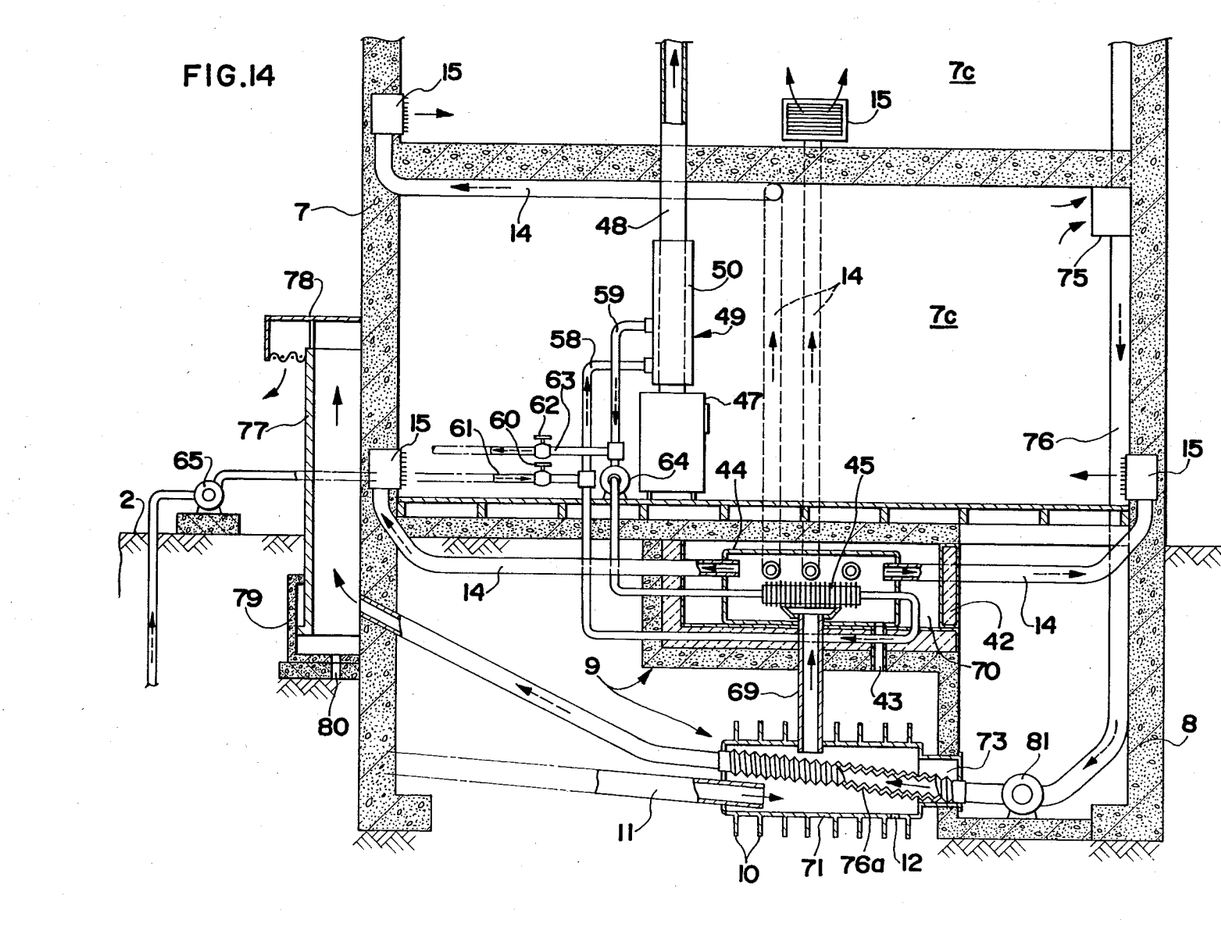
FIG. 14 is a vertical sectional view of a building where is provided a modification of the above-mentioned fourth type embodiment.

Referring to FIG. 14 illustrating a modification of the above-mentioned fourth type embodiment, wherein the elements are given the same reference character as the fourth embodiment; the present modification is different in the following points from the fourth embodiment: there is provided a room air exit 75 on a wall of an indoor room 7c, which communicates with an outdoors installed room air outlet duct 77, having the same construction as the open-air intake duct 1 shown in FIG. 5, by means of a continuous room air release pipe 76.

This room air release pipe has its one end connected with the room air exit 75, while having its other end connected with the room air outlet duct 77 through the lower transferring tank 71 and the soil. The section of the room air release pipe 76 which passes the transferring tank 71 employs a bellows type pipe 76a, whereby the coefficient of heat exchange may be increased between the released room air in the bellows type pipe 76a and the open-air drawn in the lower transferring tank 71 owing to the extended contact area of the corresponding pipe. In addition, in the longitudinal midway passage of the room air release pipe 76, there is provided a room air release pump 81.

In the operation of the above described modification except similar points to the fourth type embodiment, the air in the indoor room 7c is discharged outdoors by actuating the room air release pump 81, while the open air present in the lower transferring tank 71 gets warmed and cooled effectively in the respective winter and summer according to a temperature in the released room air.

Figure 15:
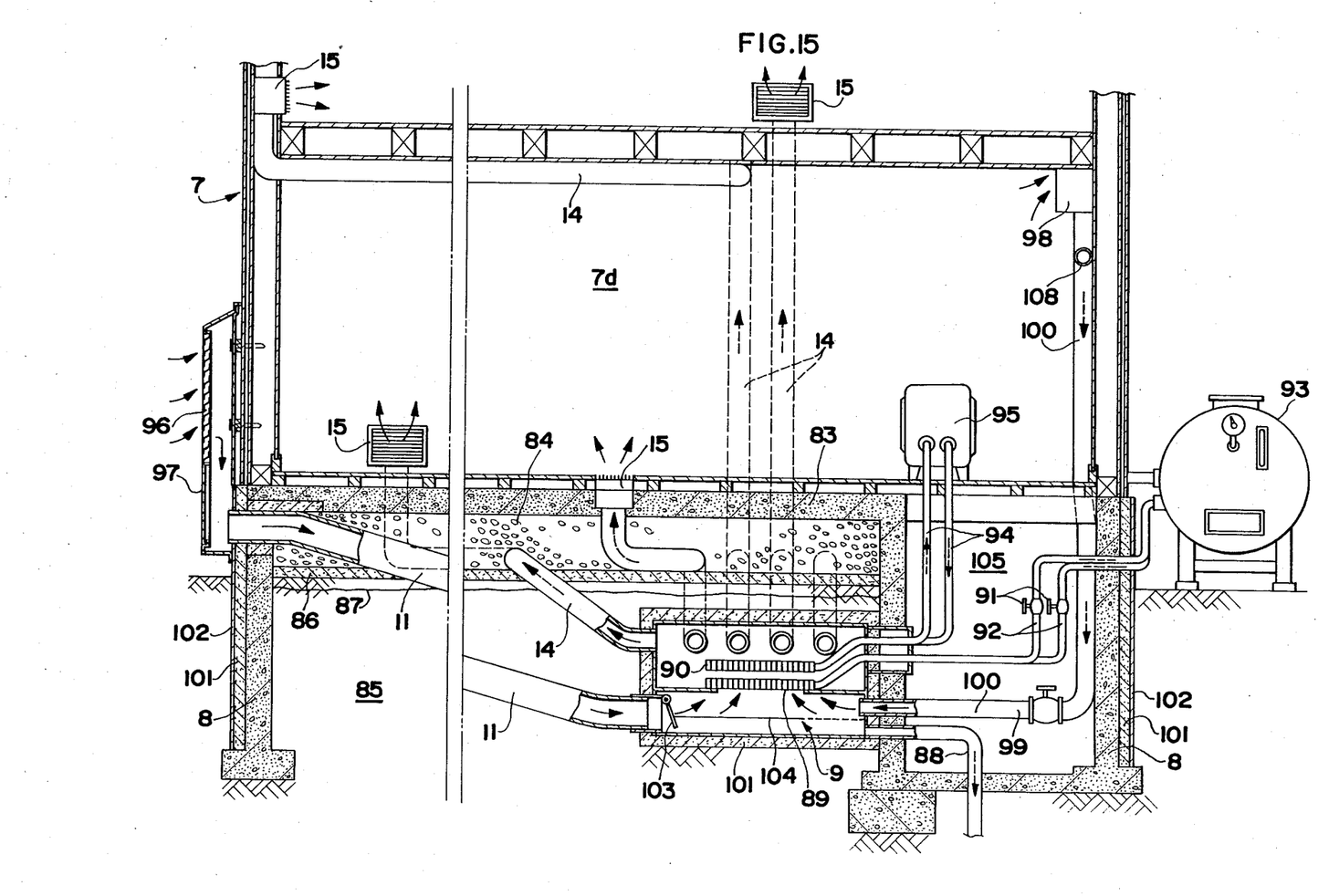
FIG. 15 is a vertical sectional view of a building which is provided the fifth type embodiment of the present invention.
Figure 16:
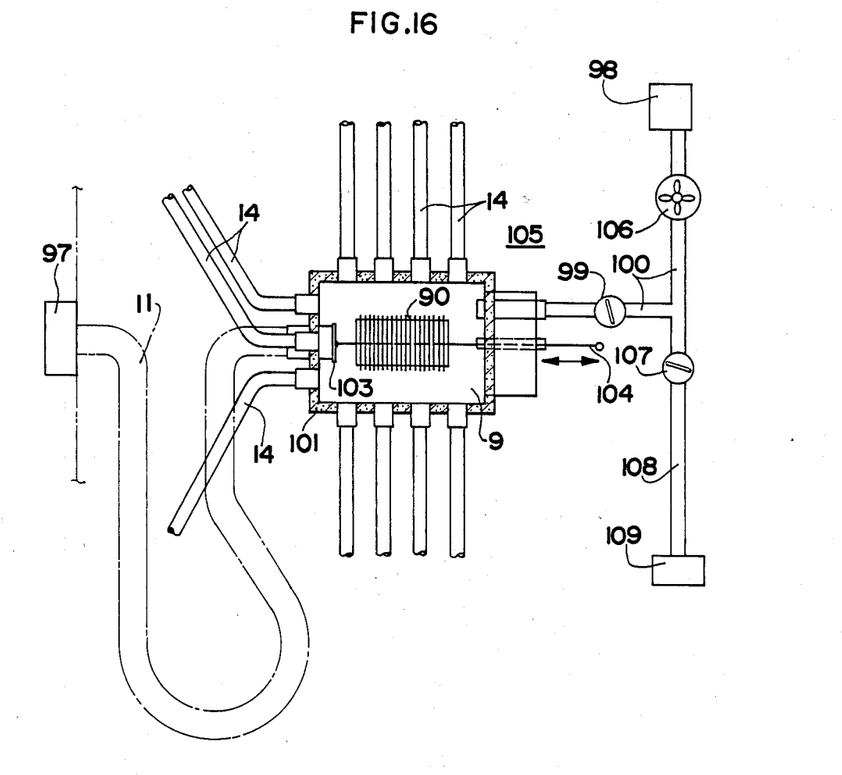
FIG. 16 is substantially horizontal view illustrative of the arrangement of the pipes etc., of the fifth type embodiment.

Referring to FIGS. 15 and 16 illustrating the fifth type embodiment of the present invention, wherein the same elements are given the same reference characters as the first type embodiment, this fifth type embodiment is different in the following points from the first embodiment: the subgrade underneath the concrete footing 83 of a building 7 consists, as apparent from FIG. 15, of a lower heat reserve bed of a high density of soil present substantially at the building place and a upper heat reserve bed of a low density mixed with coarse pieces of cobble stone and brick, which are separated by a insulator 86 made up mainly of polyurethane foam plastics. In addition, the lower heat reserve bed 85 has a dampproof sheet 87 synthetic resin interposed by a little under from the upper face thereof.

In the lower heat reserve bed 85, there is buried a transferring tank 9 fitted with a drain pipe 88, wherein are disposed a heat radiator 89 and a heat absorber 90 formed respectively into a cylinder of stainless steel around which are fixed with a great number of fins. The heat radiator 89 communicates with a hot-water supply boiler 93 installed outdoors by hot-water circulation pipes 92 with a valve 91, while the heat absorber 90 communicates with a cooling apparatus 95 installed indoors by a cooling medium circulation pipes 94.

The open-air flow pipe 11, of which a portion is placed in the upper heat reserve bed 85, has its one end connected with a open-air intake duct 97 possessing an open-air intake port 96, while has its other end connected with the transferring tank 9 near its bottom. The open-air distribution pipe 14 is connected with transferring tank 9 near its top. The transferring tank 9 and a room air exit 98 provided on the indoor wall of the building communicates with one another by a room air release pipe 100 with a valve 99.

The transferring tank 9 and several concrete foundation walls 8 have their external faces covered with insulators 101 made mainly of polyuretane foam plastics. In addition, on the insulators covering the concrete foundation walls, mortar 102 is applied.

Referring to FIG. 16 illustrating the arrangement of pipes, etc., the transferring tank 9 is provided inside with a damper 103 which may open or close the opening of the open-air flow pipe 11, for which an operating wire 104 is extended into an underground inspection room 105. In the passage of the room air release pipe 100, there is provided an exhaust fan 106. Additionally, between the exhaust fan and valve 99, the room air release pipe 100 is connected with an exhaust pipe 108 with a valve 107 which communicates with an outlet port 109 provided outdoors.

In the operation of the fifth embodiment described above, in respect to use in winter, first the damper 103 is opened by pulling the operating wire 104, whereby the open-air flow pipe 11 leads to the transferring tank 9. At the same time the exhaust fan 106 and the hot-water supply boiler 93 are actuated in a condition that the valve 91 of the hot-water circulation pipe 92 is opened while the valve 99 of the room air release pipe 100 is shut, whereby the hot water is supplied from the boiler 93 through the hot-water circulation pipe 92 to the heat radiator 89, so that the air inside the transferring tank 9 is heated to a great degree. The heat radiated in the transferring tank 9 is partly transported and reserved in the lower and upper heat reserve beds enclosed by the concrete foundation walls 8 and the concrete footing 83, thereby acting effectively on the open air flowing inside every pipe.

On the other hand, first the open air drawn in the open-air intake duct 97 is warmed by the subterranean heat during passing the flow pipe 11, and then enters the transferring tank 9, wherein the open air is still more heated to a great extent by the radiator 89. In the next stage, the remarkably warmed open air in the transferring tank 9 is drawn in every indoor room 7*d* through the open-air distribution pipes 14 and the ventilation openings 5; whereby every indoor room 7*d* gets warmed.

The polluted room air in the indoor room 7*d* is attracted to the room air exit 98 by the exhaust fan 106, and finally is discharged outdoors from the outdoor outlet port 109.

In respect to use in summer, the valves 91, 107 of the hot-water circulation pipe 92 and exhaust pipe 108 are closed while the valve 99 of the room air release pipe 100 is opened, and at the same time the cooling apparatus 95 is actuated in a condition that the damper 105 is somewhat opened by the suitable operation of the operating wire 104, whereby a cooling medium such as Freon is supplied from the cooling apparatus 95 through the cooling medium circulation pipe 94 into the heat absorber 90, so that the air inside the transferring tank 9 is cooled to a great degree. The considerably cooled air in the transferring tank 9 is drawn in every indoor room 7*d* through the open-air distribution pipes 14 and the ventilation openings 5, whereby every indoor room 7*d* gets cooled.

Furthermore, the air in the indoor room 7*d* is attracted to the room air exit 98 by the exhaust fan 106, and then is returned through the room air release pipe 100 to the transferring tank 9, wherein the air is cooled again by the heat absorber 90, and is re-circulated. At the same time, the outdoor open air is drawn through the open-air intake duct 97 and the open-air flow pipe 11 into the transferring tank 9, wherein the ventilation may be performed. On this occasion, the outdoor open air which has a relatively high temperature in summer is cooled to some extent by the soil during passing the open-air flow pipe 11, so that the ventilation in the transferring tank 91 brings about little rise in temperature.

When it is unnecessary to ventilate, however, the open-air flow pipe 11 may be closed by the damper 103 through loosing the operating wire 104. In the transferring tank 9, drops of water are accumulated according to the condensation of moisture. However the condensed water is discharged outward the transferring tank 9 through the drain pipe 88.

In the above described fifth embodiment, although the hot-water supply boiler 93 is used to supply hot water to the heat radiator 89, instead of the boiler, it is possible to employ a hot-water supply apparatus utilizing the exhaust heat in a stove, or other various hot-water means. In addition, instead of the damper 103, a valve may be used. Two or more transferring tank 9 may be installed according to the number of indoor rooms 7*d*.

What is claimed is:

1. A system for drawing the open air indoors, comprising:
    a transferring tank, buried underground;
    an open-air flow-pipe buried underground over substantially its total length, having its one end connected to an intake port disposed above the ground, and its other end connected to the transferring tank;
    an open-air distribution pipe having its one end connected to at least one room of a building and having its other end communicating with the other end of said open-air flow pipe through the transferring tank;
    a first heat exchange disposed within the transferring tank, for exchanging heat with the air present in the transferring tank;
    heating apparatus having an exhaust gas flue attached thereto;
    a second heat exchange apparatus being fitted around the exhaust gas flue to extract thermal energy present in the exhaust gas flue; and
    said first and second heat exchange apparatus connected to each other through a fluid circulation pipe.

2. The system for drawing the open air indoors as defined in claim 1, wherein:
    said transferring tank is comprised of an upper transferring tank and a lower transferring tank which are connected to each other by means of a communication pipe;
    the first heat exchange apparatus disposed within tee upper transferring tank;
    the open-air flow pipe connected to the lower transferring tank and;
    the open-air distribution pipe connected to the upper transferring tank.

3. The system for drawing the open air indoors as defined in claim 2 wherein:
    the room and the outdoors of a building communicate with each other by means of a room air release pipe, a central portion of which passes through the transferring tank.

* * * * *